United States Patent
Carpinisan

(10) Patent No.: US 10,690,032 B2
(45) Date of Patent: Jun. 23, 2020

(54) UREA CONCENTRATION SENSOR REFLECTOR

(71) Applicant: GM Global Technology Operations LLC, Detroit, MI (US)

(72) Inventor: Adrian Carpinisan, Milton (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 107 days.

(21) Appl. No.: 16/032,394

(22) Filed: Jul. 11, 2018

(65) Prior Publication Data

US 2020/0018209 A1    Jan. 16, 2020

(51) Int. Cl.
*F01N 3/20* (2006.01)
*F01N 11/00* (2006.01)
*B01D 53/94* (2006.01)
*B01D 53/90* (2006.01)

(52) U.S. Cl.
CPC ............ *F01N 3/208* (2013.01); *B01D 53/90* (2013.01); *B01D 53/9495* (2013.01); *F01N 11/002* (2013.01); *F01N 11/007* (2013.01); *B01D 2251/2067* (2013.01); *F01N 2560/026* (2013.01); *F01N 2560/06* (2013.01); *F01N 2570/14* (2013.01); *F01N 2610/02* (2013.01); *F01N 2610/105* (2013.01); *F01N 2610/146* (2013.01)

(58) Field of Classification Search
CPC ... B01D 35/027; B01D 35/30; F01N 2530/18; F01N 2610/02; F01N 2610/1406; F01N 2610/1426; F01N 2610/148; F01N 2610/1493; F01N 3/2066; F01N 3/208
See application file for complete search history.

(56) References Cited

U.S. PATENT DOCUMENTS

| | | | |
|---|---|---|---|
| 9,151,736 B2* | 10/2015 | Frivik | F01N 3/208 |
| 9,732,652 B2* | 8/2017 | Fukui | F01N 3/2066 |
| 9,816,758 B2* | 11/2017 | Gismervik | F01N 3/2066 |
| 2012/0186334 A1* | 7/2012 | Steinhauser | G01N 27/123 |
| | | | 73/61.76 |
| 2016/0041024 A1* | 2/2016 | Reimer | G01F 23/2962 |
| | | | 73/290 V |

(Continued)

FOREIGN PATENT DOCUMENTS

WO    WO 2017171121    * 10/2017

*Primary Examiner* — Phutthiwat Wongwian
*Assistant Examiner* — Diem T Tran

(57) ABSTRACT

A urea concentration sensor reflector system includes a urea concentration sensor reflector assembly including a reflector having an upwardly convex dome shape integrally connected to and supported by multiple legs. The reflector includes a concave-shaped inner surface. The multiple legs are connected to and support the urea concentration sensor reflector assembly to an upward directed surface of a bottom tank wall of a urea storage tank. A sound wave generator and receiver is fixed to the bottom tank wall directly below and centrally aligned with the reflector. The sound wave generator and receiver generates ultrasonic sound waves directed upwardly toward the reflector. A concentration of a liquid urea in the urea storage tank is determined based on a time for the ultrasonic sound waves to travel to the reflector and return as echo signals to the sound wave generator and receiver, and a temperature of the liquid urea.

17 Claims, 4 Drawing Sheets

(56) References Cited

U.S. PATENT DOCUMENTS

2016/0146776 A1* 5/2016 Akiyoshi .............. F01N 11/002
                                                      73/64.53
2016/0238429 A1* 8/2016 Stangl ................... G01F 23/296

* cited by examiner

UREA CONCENTRATION SENSOR REFLECTOR

INTRODUCTION

The present disclosure relates to diesel engine vehicle urea control systems including urea concentration sensing.

Vehicles having a diesel engine require an additional treatment for exhaust gases to meet environmental regulations. One method is to inject a liquid urea into the exhaust system to mitigate against the production of excessive combustion byproducts such as elevated NOx from using diesel fuels. The liquid urea is normally stored on-board and pumped in concentrated form through a dosing injector valve which is controlled by an engine electronic control module. The effectiveness of exhaust treatments using urea solutions depends on tight correlation between fluid dosing and concentration ratio. There is no normally available system to determine the concentration of the urea when the urea storage tank is filled, therefore the vehicle is normally equipped with a urea concentration sensor.

Known urea concentration sensors operate based on measurement of a time lap that an ultrasonic wave requires to travel a predetermined distance in a urea solution. Known sensors use horizontal sound travel direction by positioning a transceiver opposed to a reflector on a dish-like horizontal plate. The measured time frame between when the signal is sent and received are influenced by distance variation between the transceiver and the reflector and a temperature of the urea solution. Because urea storage tanks are normally made of a polymeric material suitable to contain the urea, such as high density polyethylene, the positioning of the transceiver and reflector on the polymeric material tank wall are highly susceptible to temperature variation causing misalignment of the reflector and transceiver. To compensate for this known sensitivity, temperature versus urea concentration tables must be available and accessed to determine an approximate urea concentration, which leads to error in the concentration interpretation.

Thus, while current urea concentration sensors achieve their intended purpose, there is a need for a new and improved urea concentration sensor and reflector assembly.

SUMMARY

According to several aspects, a urea concentration sensor assembly includes a reflector having a dome shape integrally connected to a main sensor body and supported by multiple legs. The reflector includes a concave-shaped inner surface. The multiple legs are connected to and support the urea concentration sensor assembly to an upward directed surface of a urea storage tank bottom tank wall. A sound wave generator and receiver is fixed to the bottom tank wall directly below and centrally aligned with the reflector. The sound wave generator and receiver generates ultrasonic sound waves directed upwardly toward the reflector.

In another aspect of the present disclosure, the multiple legs include a first leg, a second leg, a third leg and a fourth leg, each equidistantly spaced apart from a successive one of the legs.

In another aspect of the present disclosure, a quantity of the multiple legs is one of three legs or more than four legs, each angularly oriented with respect to the bottom tank wall.

In another aspect of the present disclosure, the bottom tank wall is generally planar except directly below the reflector.

In another aspect of the present disclosure, the bottom tank wall directly below the reflector defines an upwardly directed convex dome surface allowing crystals or particles of urea which form at the bottom tank wall to displace by gravity outwardly and off of the dome surface.

In another aspect of the present disclosure, the sound wave generator and receiver is a ceramic piezoelectric element.

In another aspect of the present disclosure, each of the legs includes a leg portion sized to be frictionally received in a correspondingly shaped slot created in the bottom tank wall.

In another aspect of the present disclosure, the sound wave generator and receiver generates ultrasonic sound waves which are directed upward toward the reflector, the reflector including a concave-shaped inner surface defining a downward directed ultrasonic focus zone which receives and back-reflects the ultrasonic sound waves.

In another aspect of the present disclosure, the concave-shaped inner surface reflects and reconfigures the ultrasonic sound waves into a conical shaped ultrasonic cone which concentrates the reflected ultrasonic sound waves to meet at a receiver portion of the sound wave generator and receiver substantially along a central axis of the sound wave generator and receiver.

In another aspect of the present disclosure, a fixed height of the urea concentration sensor assembly is maintained between an apex of the concave-shaped inner surface and a planar upper surface of the bottom tank wall. The fixed height is maintained using a notched surface created at the same location in each of the legs which abuts directly on the planar upper surface. Each of the legs is oriented at a common angle alpha ($\alpha$) with respect to the planar upper surface in the installed position of the urea concentration sensor assembly.

According to several aspects, a urea concentration sensor system includes a urea concentration sensor assembly having a reflector having an upwardly convex dome shape integrally connected to and supported by multiple legs. The reflector includes a concave-shaped inner surface. The multiple legs are connected to and support the urea concentration sensor assembly to an upward directed surface of a bottom tank wall of a urea storage tank. A sound wave generator and receiver is fixed to the bottom tank wall directly below and centrally aligned with the reflector. The sound wave generator and receiver generates ultrasonic sound waves directed upwardly toward the reflector. A concentration reading of a liquid urea in the urea storage tank is determined based on a time for the ultrasonic sound waves to travel to the reflector and return as echo signals to the sound wave generator and receiver.

In another aspect of the present disclosure, a heater wall is positioned in proximity to the urea concentration sensor assembly in the urea storage tank energized to keep an area at least proximate to the urea concentration sensor assembly from freezing.

In another aspect of the present disclosure, a diesel exhaust fluid heating system is positioned in the urea storage tank controlling operation of the heater wall.

In another aspect of the present disclosure, the reflector and the multiple legs of the urea concentration sensor assembly are a stainless steel or a material having corrosion resistance to urea solution and having a thermal expansion similar to stainless steel.

In another aspect of the present disclosure, the bottom tank wall directly below the reflector defines an upwardly directed convex dome surface. The reflector includes a concave-shaped inner surface defining a downward directed ultrasonic focus zone which receives and back-reflects the ultrasonic sound waves toward the sound wave generator and receiver.

In another aspect of the present disclosure, a fixed height of the urea concentration sensor assembly is maintained using a notched surface created at the same location in each of the legs which abuts directly on the upward directed surface.

According to several aspects, a method for determining a urea concentration includes: connecting a reflector having an upwardly convex dome shape and a concave-shaped inner surface to multiple legs to create a urea concentration sensor assembly; positioning the urea concentration sensor assembly in a urea storage tank, including fixing the multiple legs to an upward directed surface of a bottom tank wall of the urea storage tank, or to a body of a sensor component installed in the urea storage tank; attaching a sound wave generator and receiver to the bottom tank wall directly below and centrally aligned with the reflector; operating the sound wave generator and receiver to generate ultrasonic sound waves directed upwardly toward the reflector; and determining a concentration of a liquid urea in the urea storage tank based on a time for the ultrasonic sound waves to travel to the reflector and return as echo signals to the sound wave generator and receiver, and a temperature of the liquid urea.

In another aspect of the present disclosure, the method includes: pumping urea out of the urea storage tank using a DEF pump through a DEF injector dosing valve; and injecting the urea into a mixer upstream of a catalytic converter.

In another aspect of the present disclosure, the method includes prior to the determining step reflecting and reconfiguring the ultrasonic sound waves using the concave-shaped inner surface into a conical shaped ultrasonic cone to concentrate the reflected ultrasonic sound waves to meet at a receiver portion of the sound wave generator and receiver substantially along a central axis of the sound wave generator and receiver.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
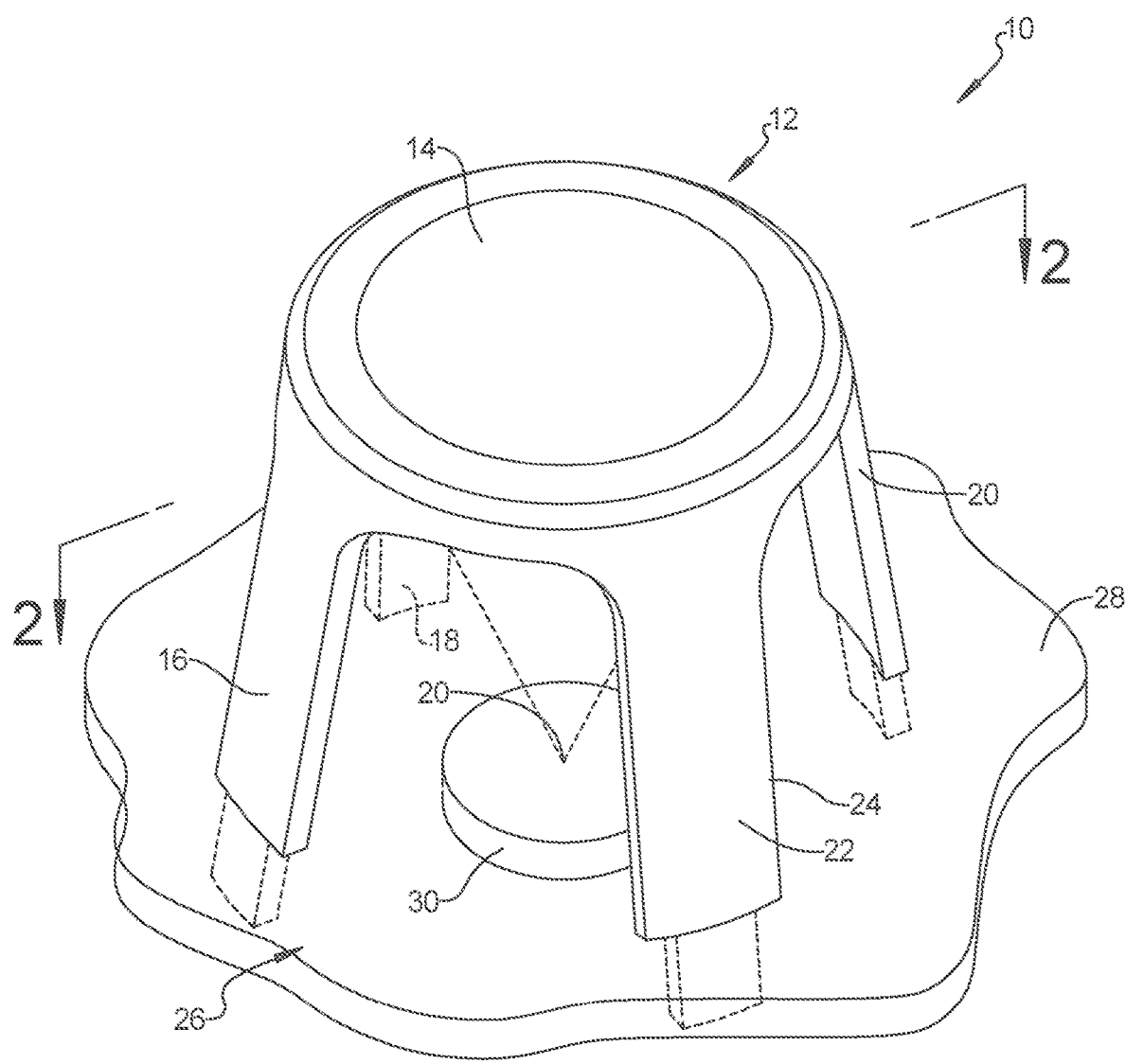
FIG. 1 is a top perspective view of a urea concentration sensor assembly according to an exemplary embodiment.

Referring to FIG. 1, a urea concentration sensor and reflector system 10 includes a urea concentration sensor reflector assembly 12 made for example from a metal such as stainless steel, which is resistant to the corrosive effects of urea liquid. The urea concentration sensor reflector assembly 12 includes a reflector 14 which is upwardly convex, dome shaped and is connected to and supported by multiple legs, which according to several aspects include a first leg 16, a second leg 18, a third leg 20 and a fourth leg 22. Each of the legs 16, 18, 20, 22 can be equidistantly spaced apart from a successive one of the legs as shown, or the legs can have a different spacing from each other. A quantity of the legs 16, 18, 20, 22 can also vary from the exemplary four legs shown, and for example can be three legs or more than four legs at the discretion of the designer. In an installed position of the urea concentration sensor reflector assembly 12 shown, the legs 16, 18, 20, 22 are connected to and support the urea concentration sensor reflector assembly 12 with respect to an upward directed surface 26 of a urea storage bottom tank wall 28, or to a body of a sensor component installed in a urea storage tank 68 shown and described in reference to FIG. 3. The bottom tank wall 28 is generally planar except directly below the reflector 14 which will be described in greater detail in reference to FIG. 2. A sound wave generator and receiver 30 is fixed to the bottom tank wall 28 directly below and centrally aligned with the reflector 14. According to several aspects, the sound wave generator and receiver 30 is a ceramic piezoelectric element of known design.

Referring to FIG. 2 and again to FIG. 1, each of the legs 16, 18, 20, 22 includes a leg portion 32 sized to be frictionally received in a correspondingly shaped slot 34 created in the bottom tank wall 28, and a portion of the leg portion 32 can extend outwardly (downwardly as viewed in FIG. 2) from the bottom tank wall 28. According to several aspects, a convex-shaped wall portion 36 is located directly under the reflector 14. The convex-shaped wall portion 36 includes an upwardly directed curved or dome surface 38 whose function includes allowing crystals or particles of urea contaminants which may form at the bottom tank wall 28 to displace by gravity outwardly and off of the dome surface 38, thereby helping to keep such crystals off of the dome surface 38 in the area of the sound wave generator and receiver 30. The normal vibrations which occur during vehicle travel and from engine operation will also assist in vibrating the urea crystals to assist in crystal gravity displacement off of the dome surface 38.

The sound wave generator and receiver 30 is fixed to a lower surface 40 of the bottom tank wall 28, and may be partially embedded within the bottom tank wall 28 as shown. Electrical power and sensing lines 42 are maintained below the lower surface 40 to the maximum extent possible to keep the electrical power and sensing lines 42 out of the interior of the tank containing the urea liquid which is bordered by the bottom tank wall 28. In operation, the sound wave generator and receiver 30 generates ultrasonic sound waves 44 which are directed upward toward the reflector 14. The reflector 14 includes a concave-shaped inner surface 46 defining a downward directed ultrasonic focus zone 48 or reflective surface which receives and back-reflects the ultrasonic sound waves 44. The concave-shaped inner surface 46 reflects and reconfigures the ultrasonic sound waves into a conical shaped ultrasonic cone 50 which concentrates the reflected ultrasonic sound waves to meet at a receiver portion 52 of the sound wave generator and receiver 30 substantially along a central axis 54 of the sound wave generator and receiver 30. According to several aspects, the central axis 54 of the sound wave generator and receiver 30 is also oriented co-axial with a central axis 56 of the concave-shaped inner surface 46.

A concentration of the liquid urea in the urea storage tank can be determined based on a time for the ultrasonic sound waves to travel to the reflector 14 and return as echo signals to the sound wave generator and receiver 30, as well as a temperature of the liquid urea. A temperature sensor used in the urea storage tank is discussed in reference to FIG. 4. To minimize any time deviations in this determination, a fixed height 58 of the urea concentration sensor reflector assembly 12 is maintained, for example between an apex of the concave-shaped inner surface 46 and a planar upper surface 60 of the bottom tank wall 28. The fixed height 58 is maintained using a notched surface 62 created at the same location in each of the legs 16, 18, 20, 22 which abuts directly on the planar upper surface 60. In addition, each of the legs 16, 18, 20, 22 is oriented at a common angle alpha (α) with respect to the planar upper surface 60 in the installed position. To maintain the fixed height 58, each of the legs 16, 18, 20, 22 may also be fixed to the planar upper surface 60 using an adhesive such as an epoxy.

Figure 2:
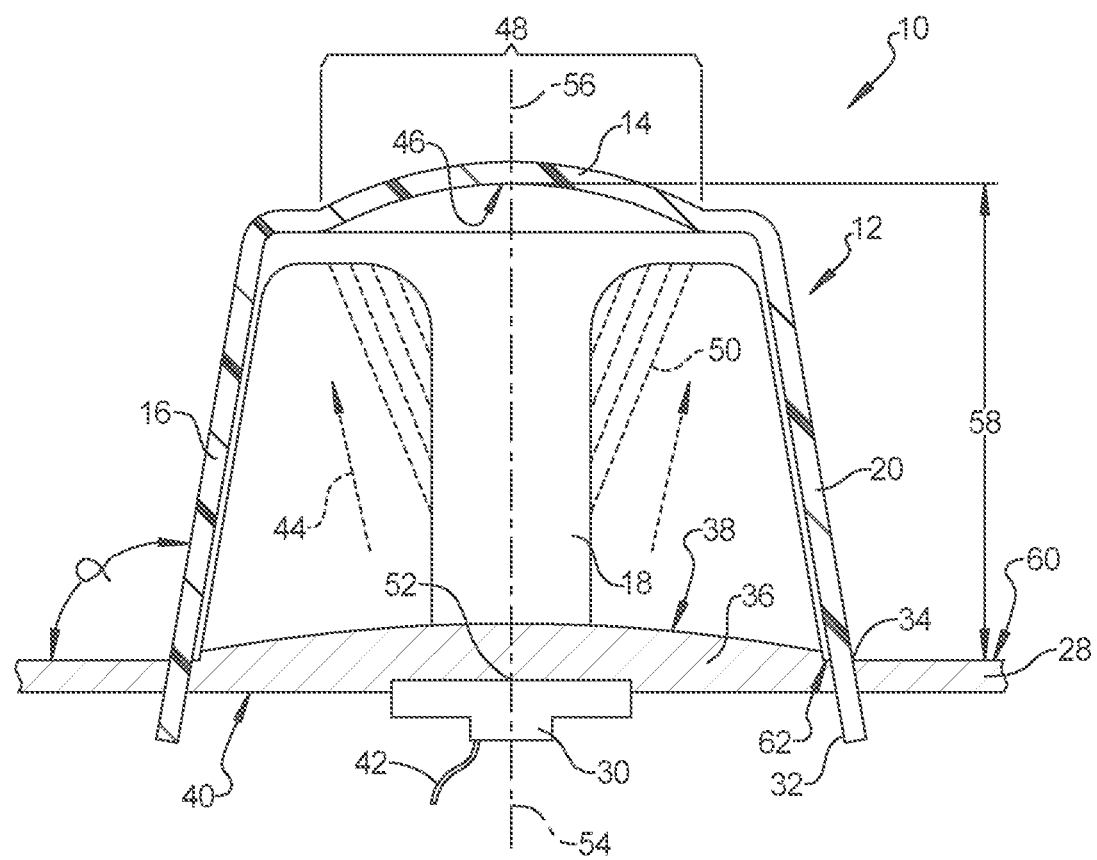
FIG. 2 is a front elevational cross sectional view taken at section 2 of FIG. 1.
Figure 3:
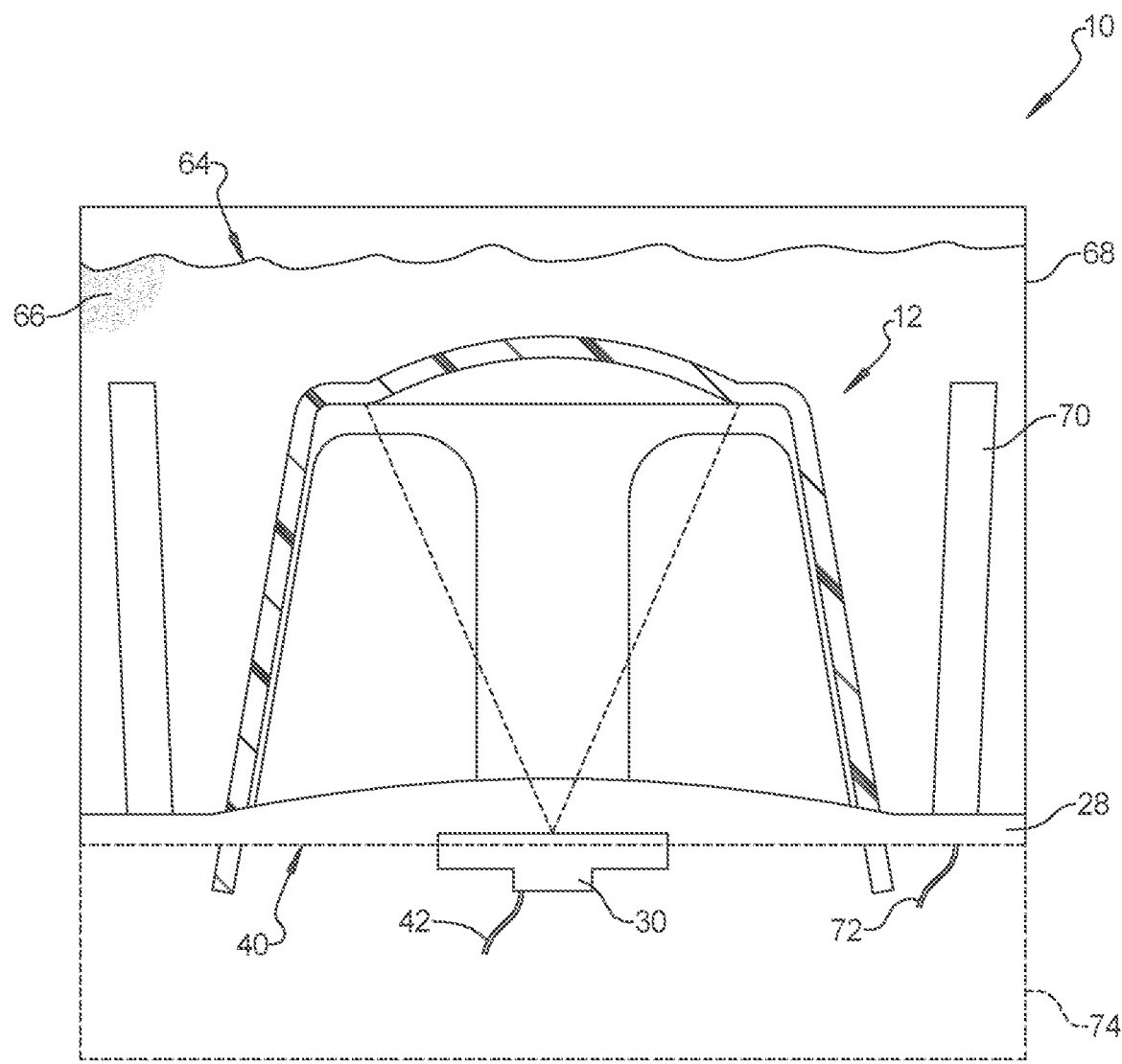
FIG. 3 is a front elevational cross sectional view similar to FIG. 2 modified to add a tank and a heater.
Figure 4:
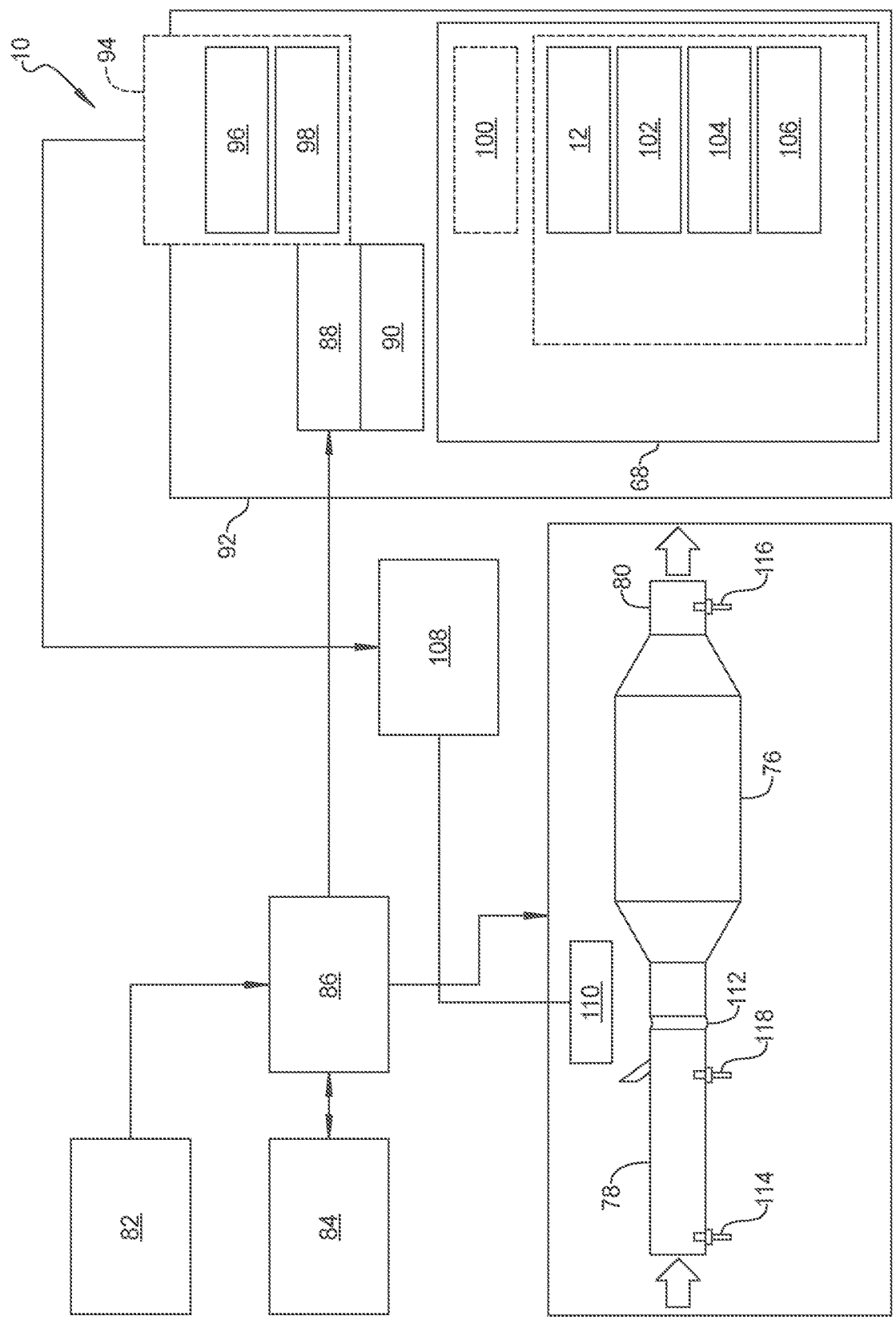
FIG. 4 is a diagrammatic presentation of a DEF system employing the urea concentration sensor assembly of FIG. 1.

Referring to FIG. 3, a liquid level 64 of a liquid urea 66 in the urea storage tank 68 is monitored using a liquid level sensor discussed in reference to FIG. 4. A heater wall 70 is provided in proximity to the urea concentration sensor reflector assembly 12 which is energized to keep the urea 66 at least in the proximate area of the urea concentration sensor reflector assembly 12 from freezing. The heater wall 70 is connected to a power source (not shown) using a power cable 72, which together with the electrical power and sensing lines 42 discussed in reference to FIG. 2 are retained within an electronics dry zone 74 below the lower surface 40 of the bottom tank wall 28.

Referring to FIG. 4 and again to FIGS. 1 through 3, to control operation of the urea concentration sensor and reflector system 10, as well as the emissions of a diesel engine operated vehicle, urea is injected into the exhaust stream of diesel engine vehicles as Diesel Exhaust Fluid (DEF) to break down NOx emissions into nitrogen and water. DEF is approximately 32.5% urea and 67.5% de-ionized water. Diesel engines can be run with a lean burn air-to-fuel ratio (overstoichiometric ratio), to ensure a full combustion of soot and to prevent exhausting unburnt fuel. An excess of air leads to generation of nitrogen oxide ($NO_x$) pollutants from the nitrogen in the air. Selective catalytic reduction (SCR) in an SCR catalytic converter 76 is used to reduce the amount of $NO_x$ released into the atmosphere. The urea is provided as diesel exhaust fluid (DEF) from the separate urea storage tank 68 and injected into the exhaust system 78, where the aqueous urea vaporizes and decomposes to form ammonia and carbon dioxide. Within an SCR catalyst, $NO_x$ is catalytically reduced by the ammonia ($NH_3$) into water ($H_2O$) and nitrogen ($N_2$), which are released through an exhaust system discharge portion 80.

A set of emissions requirements 82 and sensor signals providing multiple current driving conditions 84 such as vehicle speed, ambient temperature, and the like are fed into a vehicle electronics control module 86, which may include a processor. The electronics control module 86 communicates with a DEF control module 88 which directly controls operation of a DEF pump 90 to pump DEF fluid out of the urea storage tank 68. The DEF control module 88 and the DEF pump 90 form a portion of a DEF components management system 92. A DEF distribution system 94 includes a set of DEF supply line heaters 96 and multiple DEF supply lines 98. The urea storage tank 68 includes a DEF heating system 100 which controls operation of the heater wall 70 discussed in reference to FIG. 3, the urea concentration sensor reflector assembly 12, a DEF pressure sensor 102, a DEF temperature sensor 104, and a DEF level sensor 106, each also controlled by the DEF components management system 92.

Using control signals received from the vehicle electronics control module 86 and the DEF components management system 92, urea is pumped out of the urea storage tank 68 using the DEF pump 90 through the DEF distribution system 94 and directed through a DEF injector dosing valve controlled using a DEF dosing controller 110 and injected into a mixer 112 upstream of the SCR catalytic converter 76. A first $NO_x$ sensor 114 may be positioned upstream of the SCR catalytic converter 76 and a second $NO_x$ sensor 116 may be positioned downstream of the SCR catalytic converter 76. A temperature sensor 118 is also positioned upstream of the SCR catalytic converter 76.

The urea concentration sensor and reflector system 10 of the present disclosure is described in reference to use in determining a concentration of urea for use in a urea injection or DEF system of a diesel engine vehicle. The urea concentration sensor reflector assembly 12 can also be adapted for use in measuring the concentration of substantially any liquid by first determining the time of reflection of the ultrasonic sound waves 44 for the specific desired liquid and modifying the fixed height 58 as necessary.

A urea concentration sensor and reflector system 10 of the present disclosure offers several advantages. These include the provision of the convex-shaped wall portion 36 having an upwardly directed convex dome surface 38 on top of the sound wave generator and receiver 30 which provides a natural gravity induced, self-cleaning function for the area of the bottom tank wall 28 proximate to the sound wave generator and receiver 30. The provision of a vertical sound travel direction from the sound wave generator and receiver 30 to and from the reflector 14 promotes a concentration of the average function for cases of urea concentration gradient formations. The use of stainless steel for the urea concentration sensor reflector assembly 12 or a material with similar coefficient of thermal expansion with the ability to function in a urea concentration reduces by more than 80% the influence of hardware thermal growth on ultrasonic sound travel time. This simplifies or eliminates the need for temperature vs urea concentration tables. The present method of attaching the urea concentration sensor reflector assembly 12 and the shape of the reflector 14 also mitigates against an echo lost condition due to thermal deformation of the body.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A urea concentration sensor reflector assembly, comprising:
   a reflector having a dome shape integrally connected to and supported by multiple legs, the reflector including a concave-shaped inner surface;
   the multiple legs connected to and supporting the urea concentration sensor assembly to an upward directed surface of a urea storage tank bottom tank wall, the bottom tank wall generally planar except directly below the reflector, the bottom tank wall directly below the reflector defining an upwardly directed convex dome surface allowing crystals or particles of urea which form at the bottom tank wall to displace by gravity outwardly and off of the dome surface; and a sound wave generator and receiver fixed to the bottom tank wall directly below and centrally aligned with the reflector, the sound wave generator and receiver generating ultrasonic sound waves directed upwardly toward the reflector.

2. The urea concentration sensor reflector assembly of claim 1, wherein the multiple legs include a first leg, a second leg, a third leg and a fourth leg, each equidistantly spaced apart from a successive one of the legs.

3. The urea concentration sensor reflector assembly of claim 1, wherein a quantity of the multiple legs is one of three legs or more than four legs, each angularly oriented with respect to the bottom tank wall.

4. The urea concentration sensor reflector assembly of claim 1, wherein the sound wave generator and receiver is a ceramic piezoelectric element.

5. The urea concentration sensor reflector assembly of claim 1, wherein each of the legs includes a leg portion sized to be frictionally received in a correspondingly shaped slot created in the bottom tank wall.

6. The urea concentration sensor reflector assembly of claim 1, wherein the sound wave generator and receiver generates ultrasonic sound waves which are directed upward toward the reflector, the reflector including a concave-shaped inner surface defining a downward directed ultrasonic focus zone which receives and back-reflects the ultrasonic sound waves.

7. The urea concentration sensor reflector assembly of claim 6, wherein the concave-shaped inner surface reflects and reconfigures the ultrasonic sound waves into a conical shaped ultrasonic cone which concentrates the reflected ultrasonic sound waves to meet at a receiver portion of the sound wave generator and receiver along a central axis of the sound wave generator and receiver.

8. The urea concentration sensor reflector assembly of claim 1, wherein:
 a fixed height of the urea concentration sensor assembly is maintained between an apex of the concave-shaped inner surface and a planar upper surface of the bottom tank wall;
 the fixed height is maintained using a notched surface created at the same location in each of the legs which abuts directly on the planar upper surface; and
 each of the legs is oriented at a common angle alpha (α) with respect to the planar upper surface in an installed position of the urea concentration sensor assembly.

9. A urea concentration sensor reflector system, comprising:
 urea concentration sensor assembly including:
  a reflector having an upwardly convex dome shape integrally connected to and supported by multiple legs, the reflector including a concave-shaped inner surface;
  the multiple legs connected to and supporting the urea concentration sensor assembly to an upward directed surface of a bottom tank wall of a urea storage tank, a fixed height of the urea concentration sensor assembly is maintained using a notched surface created at the same location in each of the legs which abuts directly on the upward directed surface; and
  a sound wave generator and receiver fixed to the bottom tank wall directly below and centrally aligned with the reflector, the sound wave generator and receiver generating ultrasonic sound waves directed upwardly toward the reflector;
 wherein a concentration of a liquid urea in the urea storage tank is determined based on a time for the ultrasonic sound waves to travel to the reflector and return as echo signals to the sound wave generator and receiver, and a temperature of the liquid urea.

10. The urea concentration sensor reflector system of claim 9, further including a heater wall positioned in proximity to the urea concentration sensor assembly in the urea storage tank energized to keep an area at least proximate to the urea concentration sensor assembly from freezing.

11. The urea concentration sensor reflector system of claim 10, further including a diesel exhaust fluid heating system positioned in the urea storage tank and controlling operation of the heater wall.

12. The urea concentration sensor reflector system of claim 10, further including an electronics dry zone located below a lower surface of the bottom tank wall outside of a liquid containing volume of the urea storage tank, wherein a power cable connected to the heater wall together with multiple electrical power and sensing lines servicing the sound wave generator and receiver are retained within the electronics dry zone.

13. The urea concentration sensor reflector system of claim 9, wherein the reflector and the multiple legs of the urea concentration sensor assembly are a stainless steel or a material having corrosion resistance to urea solution and having a thermal expansion similar to stainless steel.

14. The urea concentration sensor reflector system of claim 9, wherein:
 the bottom tank wall directly below the reflector defines an upwardly directed convex dome surface; and
 the reflector includes a concave-shaped inner surface defining a downward directed ultrasonic focus zone which receives and back-reflects the ultrasonic sound waves toward the sound wave generator and receiver.

15. A method for determining a urea concentration, comprising:
 connecting a reflector having an upwardly convex dome shape and a concave-shaped inner surface to multiple legs to create a urea concentration sensor assembly;
 positioning the urea concentration sensor assembly in a urea storage tank, including fixing the multiple legs to an upward directed surface of a bottom tank wall of the urea storage tank, or to a body of a sensor component installed in the urea storage tank;
 maintaining a fixed height of the urea concentration sensor assembly using a notched surface created at the same location in each of the legs which abuts directly on the upward directed surface;
 attaching a sound wave generator and receiver to the bottom tank wall directly below and centrally aligned with the reflector;
 operating the sound wave generator and receiver to generate ultrasonic sound waves directed upwardly toward the reflector; and
 determining a concentration of a liquid urea in the urea storage tank based on a time for the ultrasonic sound waves to travel to the reflector and return as echo signals to the sound wave generator and receiver, and a temperature of the liquid urea.

16. The method for determining a urea concentration of claim 15, further including:
 pumping urea out of the urea storage tank using a DEF pump through a DEF injector dosing valve; and
 injecting the urea into a mixer upstream of a catalytic converter.

17. The method for determining a urea concentration of claim 15, further including prior to the determining step reflecting and reconfiguring the ultrasonic sound waves using the concave-shaped inner surface into a conical shaped ultrasonic cone to concentrate the reflected ultrasonic sound waves to meet at a receiver portion of the sound wave generator and receiver along a central axis of the sound wave generator and receiver.

\* \* \* \* \*